United States Patent [19]

Kinstle

[11] 4,216,023
[45] Aug. 5, 1980

[54] ZINC SULFIDE BASED PIGMENTS CONTAINING SELENIUM

[75] Inventor: George P. Kinstle, 4149 Hart Road, Richfield, Ohio 44286

[73] Assignee: Ferro Corporation, Cleveland, Ohio

[21] Appl. No.: 11,077

[22] Filed: Feb. 12, 1979

[51] Int. Cl.² ............................................... C09C 1/04
[52] U.S. Cl. ................................... 106/293; 106/294; 106/306
[58] Field of Search ........................ 106/293, 294, 306; 423/508

[56] References Cited

U.S. PATENT DOCUMENTS

| | | | |
|---|---|---|---|
| 1,986,183 | 1/1935 | Bruce | 106/293 |
| 2,016,537 | 10/1935 | Booge | 106/293 |
| 2,111,137 | 3/1938 | Booge | 106/293 |
| 2,166,230 | 7/1939 | Booge et al. | 106/293 |
| 2,177,251 | 10/1939 | Handhan et al. | 106/293 |
| 2,406,472 | 8/1946 | Nerlinger | 106/293 |
| 2,579,020 | 12/1951 | Smith | 106/292 |
| 3,220,868 | 11/1965 | Plasch | 106/293 |
| 3,714,337 | 1/1973 | Garet | 423/508 |
| 3,802,900 | 4/1974 | Broll et al. | 106/293 |
| 3,847,639 | 11/1974 | Broll et al. | 106/293 |
| 3,852,639 | 12/1974 | Daly | 106/293 |
| 4,086,123 | 4/1978 | Hummel et al. | 106/293 |

FOREIGN PATENT DOCUMENTS 5175692  12/1974  Japan ........................................ 423/508

OTHER PUBLICATIONS

Robbins, M. et al. "Preparation of and Phase Relationships in Systems of the Type zns—m'm"S$_2$ where m'=Cu, Az and m'''=In. Ga, Al, "Journal of Solid State Chemistry, 5, pp. 462-466 (1972).

*Primary Examiner*—O. R. Vertiz
*Assistant Examiner*—Mark Bell
*Attorney, Agent, or Firm*—Wilson, Fraser, Barker & Clemens

[57] ABSTRACT

Pigments are disclosed comprising zinc sulfide as a host containing in solid solution at least a sufficient amount of copper indium sulfide as a dopant to alter the color of the zinc sulfide, characterized in that selenium is substituted for at least some of the sulfur. Optionally, barium sulfate may be used as an extender. The pigment may be prepared by jointly precipitating the sulfides of the indicated metals and then firing to an equilibrium temperature to achieve a desired solid solution.

14 Claims, 1 Drawing Figure

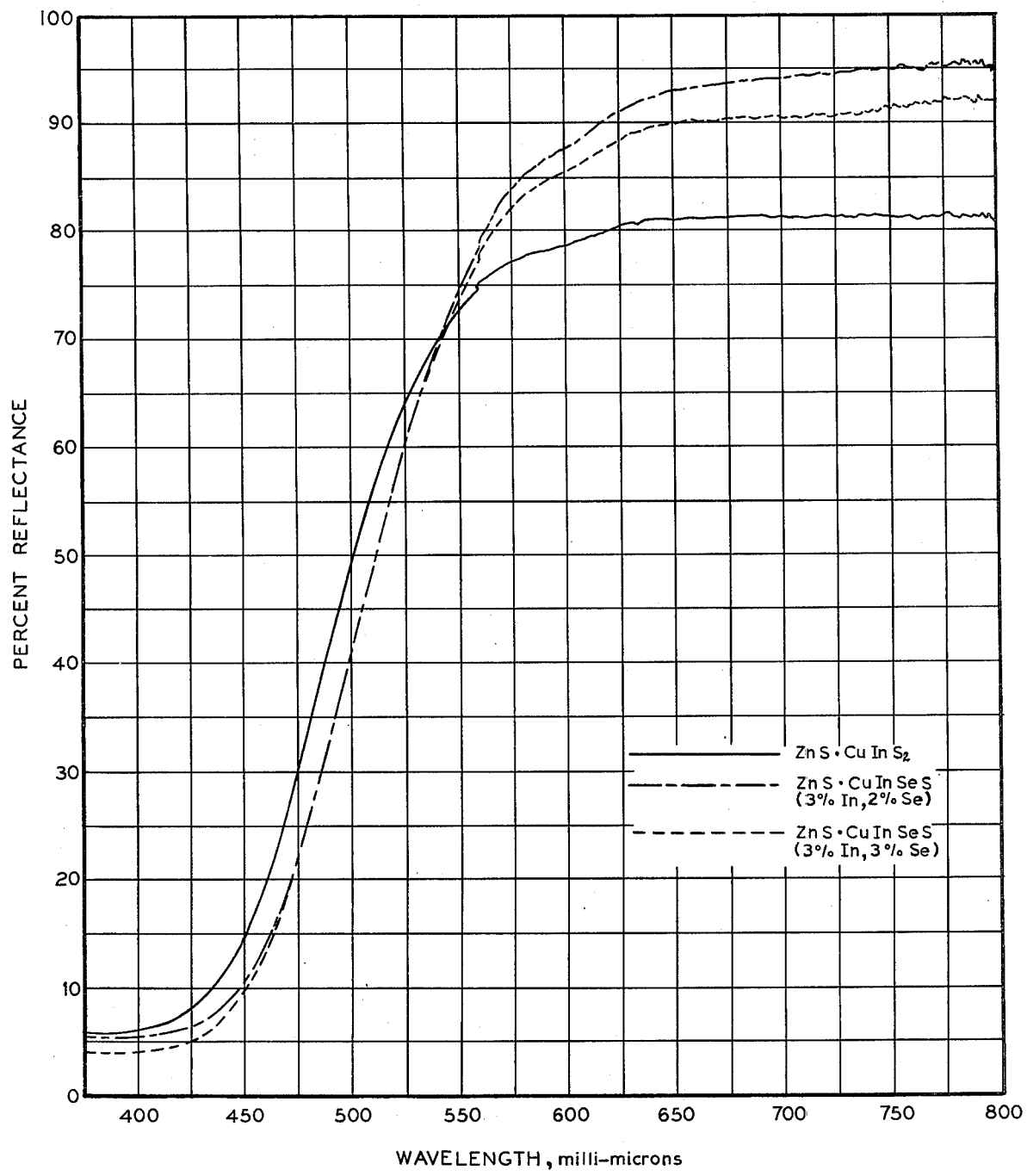

ZINC SULFIDE BASED PIGMENTS CONTAINING SELENIUM

BACKGROUND OF THE INVENTION

Pigments are widely used in many industries to impart basically a pleasing, esthetic color and appearance to various media in which they are mixed, such as paints, varnishes, lacquers, organic resins, glazes, ceramic ware such as porcelain enamels, glass, and the like. As a general rule, inorganic pigments have a greater scope of application as compared to organic pigments. Because of the more severe and drastic conditions of use in glazes and ceramic applications, particularly with reference to temperature of preparation, inorganic pigments must be used for such applications. However, inorganic pigments may also be added to organic media, such as organic resinous polymeric materials, especially when such materials are used at relatively high temperatures such as in extruding or molding.

Important inorganic red pigments include those of the cadmium sulfide-cadmium selenide series. Two additionally important inorganic yellow pigments are based on cadmium sulfide and lead antimonate (Naples Yellow). As awareness of the need for environmental protection grows, industrial use of toxic and semi-toxic chemicals has come under greater scrutiny and criticism. The use of such metals as cadmium, lead and antimony, previously extensively employed in preparing pigments, has accordingly become less popular. Stronger governmental regulation and control of their use may arise. It is, therefore, important to develop substitute pigments.

Several techniques have been previously suggested for varying the color of a pigment. One technique comprises changing the degree of fineness of the pigment grind. For example, an orange pigment comprising 99% zinc oxide and 1% manganese oxide may be altered toward yellow by increasing the fineness of the grind.

Another technique is to combine two pigments of different colors to obtain a color existing somewhere between the colors of the two pigments. For instance, blue-green pigments may be prepared in this manner by mixing a green pigment and a blue-violet pigment in proper proportions. By careful selection, a mechanical mixture of the two pigments can result in a final color mixture which has acceptable color density. However, in many instances, mixtures of different pigments result only in muddy colors.

Still another technique is to add to a basic pigment a color shifting agent in which the color absorption characteristics of the pigment is changed or shifted slightly from that which would otherwise prevail. The present invention relates to the color shifting technique for modifying the color of a pigment.

U.S. Pat. No. 4,086,123 to Hummel and Sombuthawee discloses pigments comprising zinc sulfide as a host containing in solid solution a metal sulfide dopant. The dopant may comprise one or more certain metal sulfides, but normally is present as a unitary sulfide, such as lithium sulfide, or preferably as a multiple sulfide, such as lithium indium sulfide and copper indium sulfide.

U.S. patent application Ser. No. 772,233, filed Feb. 25, 1977, now abaondoned, in the names of Hummel and Bonsall and assigned to the same assignee to which this application is assigned, discloses pigments containing zinc sulfide as a host containing in solid solution a dopant to alter the color of the zinc sulfide. The dopant may comprise one or more certain metal sulfides, but normally is present as a unitary sulfide, such as indium sulfide, or preferably as a binary sulfide, such as indium sulfide and manganese sulfide.

U.S. Pat. No. 2,579,020 to Smith discloses pigments of zinc oxide in combination with a coloring metal oxide and having as a color shifting agent magnesium oxide or cadmium oxide.

SUMMARY OF THE INVENTION

It has been found that colorful pigments can be prepared free of metals such as cadmium, lead, and antimony, by using zinc sulfide as a host and combining in solid solution with the zinc sulfide at least a sufficient amount of a dopant to alter the color of the zinc sulfide, the dopant comprising copper indium sulfide in which selenium replaces at least some of the sulfur.

The amount of dopant that may be added to the zinc sulfide host ranges from just enough to alter the color of the host to the maximum limit of solubility of the dopant in the host. However, pigments containing even more dopant, resulting in a double phase system, may be useful and are not excluded.

The effect of the substitution of selenium for at least some of the sulfur in a dopant comprising copper indium sulfide is not so much to vary the color or shade of the znc sulfide and its dopant as it is to provide a shift in the color response curve that results in a cleaner, purer, more intense, brighter color of the same shade.

To reduce the cost of the pigment, an extending amount of barium sulfate can be incorporated in the pigment structure, although the addition of barium sulfate may result in a multiphase pigment.

The pigments may be prepared by encapsulating the host zinc sulfide and the defined dopants under a vacuum and heating. Or the sulfides of indicated metals may be jointly precipitated from solution followed by heating. These procedures prevent the introduction of unwanted metal oxides. The heating preferably is carried out by slowly rising temperature to an equilibrium temperature and for a time at the equilibrium temperature to achieve solution of the dopants with the host zinc sulfide.

BRIEF DESCRIPTION OF THE DRAWINGS

The accompanying FIGURE is a graph of percent reflection against the wave length of light in millimicrons. Data for the graph was obtained by spectrophotometer from pigments of the present invention for comparison with similar data of a control pigment containing no substitution of selenium for sulfur. The illustrated curves show a shift to a higher wave length for pigments of the present invention, while improving their percent reflection at the higher wave lengths. The shift is primarily to the yellow in comparison to the control pigment.

DESCRIPTION OF THE PREFERRED EMBODIMENTS

In general, the pigments of the present invention comprise zinc sulfide as a host containing as a dopant in solid solution in a selenium-substituted copper indium sulfide. As used here and in the claims, the term "dopant" means the additive or additives which are placed in solid solution with the host zinc sulfide.

The dopant herein contemplated may be expressed as one generally corresponding to the formula:

$$CuInS_{2-x}Se_x$$

in which x is greater than zero but less than or equal to two.

As indicated, selenium may replace all of the sulfur resulting in a dopant of copper indium selenide. However, it is preferable to retain some sulfur, such that x desirably has a value of about 0.1 to about 1.0. In the preferred embodiment, sulfur and selenium are present in substantially equal atomic proportions.

The amount of dopant used with respect to the zinc sulfide host is not critical and may vary widely. The pigments comprise solid solutions where the components need not necessarily be present in any fixed chemical or stoichiometric proportions. As little as only that minimum amount needed to alter the color of zinc sulfide may be used up to the solubility limit of the dopant in the host. Even this is not the maximum amount of dopant that may be used. Amounts up to the solubility limit in the host result in pigments of a single phase system. Larger amounts of dopants can still be used, although the pigments then become a multiple phase system. The presence of a double or other multiple phase system does not necessarily destroy the effectiveness of the more desirable single phase system, although it is usually preferred that the pigment be entirely single phased.

As examples of preferred, single phased pigments, the dopant for the zinc sulfide host may range in amount from about 0.5 mole percent of the zinc sulfide up to the solubility limit of the dopant in the zinc sulfide. A more preferred range for the dopant is an amount ranging from about one mole percent to about ten mole percent of the zinc sulfide.

Still other specific molar proportions for the pigments which have been found useful include about 40 to about 95 mole percent zinc sulfide and about 5 percent to about 60 mole percent dopant. With respect to more specific molar porportions including a designation of the amount of selenium for sulfur substitution, one example pigment of the present invention may comprise in mole percent from about 50% to about 98% zinc sulfide, from about 1% to about 25% copper indium sulfide, and from about 1% to about 25% selenium sulfide.

It will be understood that minimum amounts of other ingredients can be present in the pigments as a filler, diluent, impurity, or other additive without unduly weakening the color or otherwise appreciably losing the advantages of the invention. Normally, a filler, diluent, impurity, or other additive can be present in an amount up to about 5% by weight of the pigment without seriously affecting the color and in some instances may even provide a desired off-shade. The diluent, or other like material, can be present in the pigment in two ways. It can be either physically admixed with the zinc sulfide host outside of its crystal structure, or the filler, diluent, etc., can penetrate the lattice itself, either interstitially or substitutionally.

A particularly useful filler has been found to be barium sulfate and especially lithopone which is a mixture of zinc sulfide and barium sulfate and which, in addition to adding zinc and sulfur to the system, has its own pigment qualities. Merely as examples, the barium sulfate, either as such or as lithopone, may be present up to about 5% by weight of the pigment. This may cause a multiphase pigment. A more preferred range of use is a molar amount of barium sulfide, either as such or as lithopone, up to the molar amount of zinc sulfate present.

All of the metal sulfides and/or metals used to prepare the pigments are readily available. Preparation of the pigments is not critical and, in one technique, is carried out by enclosing zinc sulfide and the dopant or reactants capable of forming the dopant in an evacuated, closed capsule, and then heating to an equilibrium temperature, that is, to an elevated, thermodynamic equilibrium temperature at which there is no more reaction or solution taking place. Upon cooling the heated sulfides, crystals of the solid solution pigment form.

However, the best mode of preparing the pigments as presently known is by jointly precipitating the sulfides of the indicated metals from solution, as hereinafter more fully described in Example 1, and then firing to an equilibrium temperature to achieve the desired solid solution and subsequently cooling.

Heating to form a solid solution may take place by heating the ingredients under a slowly rising temperature until the equilibrium temperature is reached, and then maintaining or thermally soaking the ingredients at that temperature until reaction is complete. For example, the ingredients forming the pigments may be heated from about 200° C. to about 1000° C. or higher at a rate of increase of about 10° C. per hour. The sulfides are held at the maximum equilibrium temperature as long as may be necessary for preferred complete solution, for instance, for 20 to 75 hours, and then cooled to room temperature as in a furnace. Where the encapsulated technique is used, the capsule may be plunged in cold water. The selenium, however initially present, is retained in the zinc sulfide crystal after calcination and cooling as CuInS(Se) to the extent of selenium-substitution desired for the sulfur.

If desired, a flux may be added to the ingredients forming the pigments prior to heating to promote crystallization and more rapid attainment of thermodynamic equilibrium. For example, an equal molar proportion of sodium chloride and magnesium chloride may be used as a flux.

Pigments of the invention have a color shift as compared with pigments of a zinc sulfide host and a copper indium sulfide dopant which is apparent to the human eye. An examination of the present pigments by spectrophotometer shows that while some shifting takes place toward the red and some shifting takes place from green-yellow to red-yellow, the shift is primarily to the yellow. The principal effect of the selenium-substitution therefore, is to intensify the yellow although not exclusively. In terms of Hunter coordinate values, the principal effect of the selenium-substitution is to improve the b values although not exclusively. The selenium-substitution does not appreciably change the dominant wave length which the pigment shows as a color, but the substitution does make that color cleaner, purer, and more intense.

The following examples only illustrate the invention and should not be construed as opposing limitations on the claims.

EXAMPLE 1

This example describes the presently known best mode of preparing the present pigments. The following ingredients were added with stirring to a one liter flask.

| Ingredient | Amount |
| --- | --- |
| Water | 500 ml |
| Indium | 250 ml of 0.2 molar solution of In in HCl (0.05 mole of In) |
| Copper | 250 ml of 0.2 molar solution of Cu in HCl (0.05 mole of Cu) |
| Hydrated zinc sulfate | 354 gm (1.97 moles of Zn) |

The indium and copper were present in their respective solutions as chlorides. The following ingredients were placed in a four liter beaker.

| Ingredient | Amount |
| --- | --- |
| Water | 1.5 liter |
| Ammonium sulfide | 261.54 gm in 5% aqueous solution (2 moles of $(NH_4)_2S$) |
| Selenium powder | 2 gm (0.025 mole) |
| Sodium dithionite powder | 4.41 gm (0.025 mole of $Na_2S_2O_4$) |

Each beaker was heated with stirring to 55° C. The first mentioned copper, indium, and zinc solution was then added dropwise over a period of about 30 minutes to the ammonium sulfide solution. During the addition, the system was stirred and held at 55° C. to 60° C. The system changed gradually from clear orange color to a light yellow precipitate.

After the addition was completed, additional ammonium sulfide solution was added until a positive sulfide test was obtained using lead acetate paper. The precipitate was suction filtered, washed with three liters of water, and then dried at 80° C. After drying, the material was broken into chunks and fired for about 45 minutes at 810° C. in a covered porcelain crucible until solid solution was obtained among the metal sulfides. Upon cooling a pigment resulted comprising a solid solution of a zinc sulfide host having a dopant of copper, indium, and selenium sulfides. The pigment had a golden yellow color.

EXAMPLES 2 THROUGH 13

Conventional tristimulus values X, Y, and Z were determined by standard means on different pigments prepared by the process of Example 1, differing only in the amount of selenium used. The same values were also obtained on control pigments containing no selenium and comprising a zinc sulfide host with copper indium sulfide as dopant. In the control pigments the amount of indium varied from 1 percent to 4 percent by weight. For purposes of comparison, pigments of the invention were used in which for each level of indium present in the control pigments, two additional pigments were prepared and tested in which the amount of selenium present was, respectively, two percent and three percent by weight of the pigments. Hunter coordinates were conventionally calculated from the tristimulus values as follows:

L is a measure of the reflectance ($L = 10Y^{\frac{1}{2}}$);
a is a measure of the redness-greenness ($a = 17.5(1.02X - Y)/Y^{\frac{1}{2}}$); and
b is a measure of the yellowness-blueness ($b = 7(Y - 0.847Z)/Y^{\frac{1}{2}}$).

Table A summarizes the results of the pigments tested as masstone. The wave length indicated is the wave length of the light which dominates the color of the pigment and is expressed in millimicrons. The column headed "%P" indicates the purity of intensity of the color. The higher the number the greater the purity. These values were obtained from standard tables of the chromaticity diagram.

TABLE A

Hunter Coordinates of Se-Substituted Pigments of $ZnS \cdot CuInS_2$

| Ex. | %In %Se (By weight) | L | a | b | $\sqrt{a^2 + b^2}$ | Wave Length mm. | %P |
| --- | --- | --- | --- | --- | --- | --- | --- |
| 2 | 1 - 0 | 86.74 | −7.74 | 33.1 | 33.97 | 574 | 41 |
| 3 | 1 - 2 | 86.58 | 8.51 | 31.73 | 32.84 | 573 | 40 |
| 4 | 1 - 3 | 88.03 | 9.28 | 33.3 | 34.56 | 573 | 41 |
| 5 | 2 - 0 | 80.17 | 5.43 | 38.77 | 39.17 | 575 | 59 |
| 6 | 2 - 2 | 84.35 | 5.48 | 39.9 | 40.26 | 575 | 57 |
| 7 | 2 - 3 | 81.61 | −4.82 | 42.65 | 42.91 | 578 | 70 |
| 8 | 3 - 0 | 78.95 | 4.93 | 40.2 | 40.5 | 575 | 62 |
| 9 | 3 - 2 | 80.21 | 2.16 | 44.83 | 44.86 | 577 | 71 |
| 10 | 3 - 3 | 79.46 | −0.816 | 44.9 | 44.88 | 577 | 73 |
| 11 | 4 - 0 | 75.59 | 2.29 | 43.45 | 43.53 | 578 | 75 |
| 12 | 4 - 2 | 77.31 | 1.85 | 44.1 | 44.17 | 578 | 74 |
| 13 | 4 - 3 | 70.35 | 9.535 | 43.85 | 44.89 | 580 | 83 |

Table A emphasizes the unexpected improvements afforded by the selenium substitution. In every example, as selenium was substituted and its amount increased, there was a corresponding increase in that value calculated as the square root of the sum of the squares of the a and b Hunter coordinates. This is primarily due, as the table indicates, to a corresponding increase in the value of the b coordinate which entered into the calculation. Similarly, while the value for the percent purity remained substantially the same for low levels of indium (Examples 2, 3, and 4), there was radical improvement in this value at higher levels of indium for which three percent selenium was substituted in the pigments, (Examples 7, 10, and 13).

The percent reflection as measured against the wave length of light in millimicrons was obtained on the pigments of Examples 8, 9, and 10 by a Beckman Spectrophotomer Acta IV-M. The accompanying FIGURE shows the plotted results in which the solid line represents Example 8, the control pigment (no selenium); the dot-dash line represents Example 9, (two percent selenium); and the broken line represents Example 10, (three percent selenium). From approximately a wave length of 470 to a wave length of 535 and a percent reflection from about 17.5 percent to about 17 percent, the curves for Examples 9 and 10 coincide and, although the dot-dash line is used, it will be understood that this line for the extent of the graph indicated represents the values for both Examples 9 and 10.

While the slope of the center portions of the lines for Examples 9 and 10 (sometimes referred to as the absorption edge) is substantially the same as that for Example 8, two other significant changes are shown. There is a significant shift in the pigments of both Examples 9 and 10 to a higher wave length for percentage reflectances ranging from about 8 percent of about 68 percent. Further, for wave lengths of light greater than about 540 millimicrons, there is remarkable improvement in the percentage reflection for Examples 9 and 10, extending to as much as an increase of about 11 percent and about 13 percent, respectively, at a wave length of 800 millimicrons. The color of the pigments in these ranges are therefore cleaner, purer, and more intense than the color of the controlled pigment, Example 8.

The pigments may be used in a conventional manner to color ceramics, including porcelain enamels, glazes, glasses, plastics, paints, varnishes, lacquers, and the like.

Although the foregoing describes several embodiments of the present invention, it is understood that the invention may be practiced in still other forms within the scope of the following claims.

I claim:

1. In a pigment comprising a zinc sulfide host containing in solid solution a sufficient amount of copper indium sulfide to alter the color of the zinc sulfide; the improvement comprising substituting selenium in said copper indium sulfide for at least some of the sulfur up to all of said sulfur, said substitution of selenium causing a shift in the color response curve of said pigment determined by plotting wave length against percent reflectance.

2. A pigment comprising a zinc sulfide host containing in solid solution at least a sufficient amount of a dopant to alter the color of the zinc sulfide, said dopant corresponding to the formula:

$$CuInS_{2-x}Se_x$$

in which x is greater than zero but less than or equal to two, the presence of said selenium causing a shift in the color response curve of said pigment to a higher wave length and imparting a more intense color to said pigment.

3. The pigment of claim 2 in which x has a value of about 0.1 to about 1.0.

4. The pigment of claim 2 in which said dopant is present in an amount ranging from about 1 mole percent to about 10 mole percent of the zinc sulfide.

5. The pigment of claim 2 in which said dopant is present in an amount ranging from about 0.5 mole percent of the zinc sulfide to the solubility limit of the dopant in said zinc sulfide.

6. The pigment of claim 2 in which sulfur and selenium are present in substantially equal atomic proportions.

7. The pigment of claim 2 in which said host is present in an amount of about 40 to about 95 mole percent, and said dopant is present in an amount of about 5 to about 60 mole percent.

8. A pigment comprising a zinc sulfide host containing in solid solution at least a sufficient amount of a dopant to alter the color of the zinc sulfide, said dopant comprising copper indium selenide, the presence of selenium in said pigment causing a shift in the color response curve of said pigment to a higher wave length and imparting a cleaner, purer, more intense color to said pigment.

9. The pigment of claim 2 comprising in mole percent from about 50% to about 98% zinc sulfide, from about 1% to about 25% copper indium sulfide, and from about 1% to about 25% selenium sulfide.

10. The pigment of claim 2 in which said solid solution is single phased.

11. The pigment of claim 2 containing an extending amount of barium sulfate.

12. The pigment of claim 2 containing barium sulfate in a molar amount up to substantially the molar amount of zinc sulfide present.

13. The pigment of claim 2 containing an extending amount of lithopone.

14. The pigment of claim 2 in which said solid solution is multiple phased.

* * * * *